United States Patent [19]

Leason

[11] Patent Number: 4,601,820

[45] Date of Patent: * Jul. 22, 1986

[54] LOW-PROFILE INLINE FILTER

[75] Inventor: Hayden Leason, Humacao, P.R.

[73] Assignee: Filtertek, Inc., Hebron, Ill.

[*] Notice: The portion of the term of this patent subsequent to Aug. 23, 2000 has been disclaimed.

[21] Appl. No.: 592,958

[22] Filed: Mar. 23, 1984

[51] Int. Cl.[4] .............................................. B01D 35/14
[52] U.S. Cl. .................................... 210/94; 210/441; 210/446; 210/927
[58] Field of Search .................. 210/94, 433.1, 433.2, 210/437, 441, 442, 445, 447, 448, 451, 452, 453, 454, 500.2, 927, 446; 604/52; 156/64, 73.1

[56] References Cited

U.S. PATENT DOCUMENTS

| 3,905,905 | 9/1975 | O'Leary et al. | 210/445 |
| 3,932,153 | 1/1976 | Byrns | 210/445 |
| 3,954,625 | 5/1976 | Michalski | 210/445 |
| 3,970,084 | 7/1976 | Raines et al. | 210/445 |
| 4,013,072 | 3/1977 | Jess | 210/94 |
| 4,331,491 | 5/1982 | Shaw et al. | 156/64 |
| 4,391,662 | 7/1983 | Mauthe | 156/64 |
| 4,400,277 | 8/1983 | Leason | 210/441 |
| 4,450,078 | 5/1984 | Walker et al. | 210/927 |
| 4,453,927 | 6/1984 | Sinko | 604/52 |

Primary Examiner—Richard V. Fisher
Assistant Examiner—Wanda L. Millard
Attorney, Agent, or Firm—Willian Brinks Olds Hofer Gilson & Lione Ltd.

[57] ABSTRACT

An improved low-profile inline filter unit comprising a housing unit and filter frame. The filter frame being adapted to fit substantially within the housing so that the filter frame may be sonically welded to the housing unit. The housing unit and filter frame cooperating to provide a visible indicator for determining whether an internal hermetic seal is present between the housing unit and filter frame.

18 Claims, 6 Drawing Figures

LOW-PROFILE INLINE FILTER

BACKGROUND OF THE INVENTION

This invention relates to improvements in low-profile inline filters for use in intravenous (IV) sets and the like.

Low-profile inline IV filters are known in the art. These filters are generally connected in series with an IV tube to filter the fluid flowing through the IV tube before it enters a patient. These filters offer advantages over larger, bulkier filters, in that they can be conveniently located on the IV line at a site close to where the line connects to the patient. Therefore, they can be located without causing an obstruction to the manipulation of the IV line and the injection needle, and without presenting a bulky mass that can disturb the IV connection either by pulling on it with its own weight or by being bumped, pulled, or snagged.

Because, the low-profile inline filters are utilized to filter fluid before it enters the patient, great care must be taken so that the filters have no leaks, external or internal, at the points of connection of the various elements. These units must be hermetically sealed or the fluid entering the body may be contaminated causing infection or the spread of disease.

Low-profile inline filters are constructed from a plurality of parts. U.S. Pat. No. 4,400,277 to Leason discloses a low-profile inline filter constructed from two parts. These two parts comprise, a tubular housing shell unit, open at one end, and an elongated screen unit, which includes a cap portion. The screen unit is adapted to fit substantially within the tubular housing unit. The screen unit includes a ring member which seats on a stepped portion of the housing shell unit. The ring member and stepped portion, and the cap portion and opening of the housing unit must be sealed together. Typically, these units are sonically welded together to form a hermetic seal.

As stated above, because these units are utilized to filter fluids before they enter a patient's blood stream, the filter unit must be hermetically sealed. Accordingly, these filters must be tested to insure that a hermetic seal is present. The external seal between the cap portion and housing of the low-inline profile units are tested by passing fluid under pressure through the housing unit to see if they leak.

Especially difficult to test is the internal seal between the filter frame and housing. Because this is an internal seal and located near the inlet end it is very difficult to determine whether the required hermetic seal is present. Moreover, because this seal determines whether the fluid which enters the housing will be filtered or not it is extremely important that the requisite seal is present.

Typically, this seal is tested by passing alcohol under low pressure through the filter and determining whether bubbles are passing between the filter frame and housing. As can be easily appreciated, this is a very time consuming process and results in an increase cost for the filter and a limit on the number of filters which may be tested.

Thus, there is a need for a low-profile inline filter which is so constructed and arranged that one may readily determine whether an internal hermetic seal is present between the filter frame and the housing unit.

SUMMARY OF THE INVENTION

The present invention is directed toward an improved low-profile inline filter for an IV administration set or the like. The inline filter comprises a housing unit, including an inlet at one end and an opening at the other end, and a filter frame, including an outlet at one end, ring member at the other end, and rib members for supporting a filter membrane therebetween. The filter frame is adapted to fit substantially within the housing. When so received, the ring member is welded to an interior portion of the walls of the housing. The ring member and housing cooperate to produce a visible indicator for determining if an internal hermetic seal is present.

The housing unit is at least partially translucent and the ring member opaque. Preferably, the interior walls of the housing unit include a stepped portion on which the ring member seats.

Preferably, the visible indicator is a visible line circumscribing a portion of the interior walls of the housing unit. If an internal hermetic seal is not present between the ring member and the housing unit the visible line is disjointed.

Accordingly, an advantage of the present invention is that it provides a low-profile inline filter which allows one to visually determine whether an internal hermetic seal is present between the filter frame and the tubular housing unit.

A further advantage of the present invention is that the filter frame and housing unit are so constructed and arranged that when the filter frame is sonically welded to the housing unit near the inlet port, a visible line circumscribes the interior walls of the housing unit allowing one to determine if a hermetic seal is present between the two parts.

Another advantage of the present invention is that it provides a two piece low-profile inline filter comprising a filter frame and tubular housing unit, the filter frame including a ring member, and the housing unit including a stepped interior wall to which the ring member is welded.

Moreover, an advantage of the present invention is to provide a low-profile filter comprising a filter frame, including a ring member, and a housing unit, including a stepped interior wall, on which the ring member may seat; the ring member and interior wall cooperate when they are sonically welded to produce a method for determining whether a hermetic seal is present between the ring member and the interior wall.

Additionally, an advantage of the present invention is that a portion of the housing unit is translucent and the ring member is opaque so that when the ring member is hermetically sealed to a portion of the housing unit a visible line circumscribes at least a portion of the housing unit.

Moreover, an advantage of the present invention is that when the filter frame is not hermetically sealed to the housing unit a disjointed line is produced.

A further advantage of the present invention is a low-profile inline filter which may be readily inspected to determine if a hermetic seal is present between the filter frame and housing unit.

Additional features and advantages are described in, and will be apparent from, the detailed description of the preferred embodiments and from the drawings.

DETAILED DESCRIPTION OF THE PRESENTLY PREFERRED EMBODIMENTS OF THE INVENTION

Figure 1:
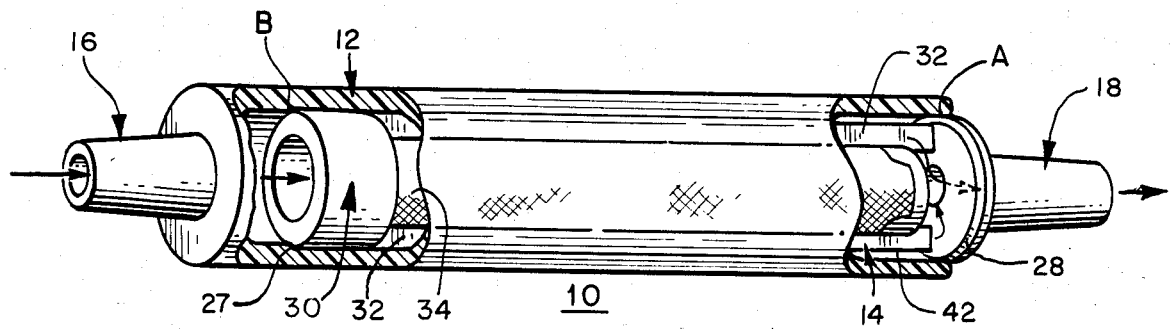
FIG. 1 illustrates a perspective view with parts broken away of a preferred embodiment of the low-profile inline filter.
Figure 2:
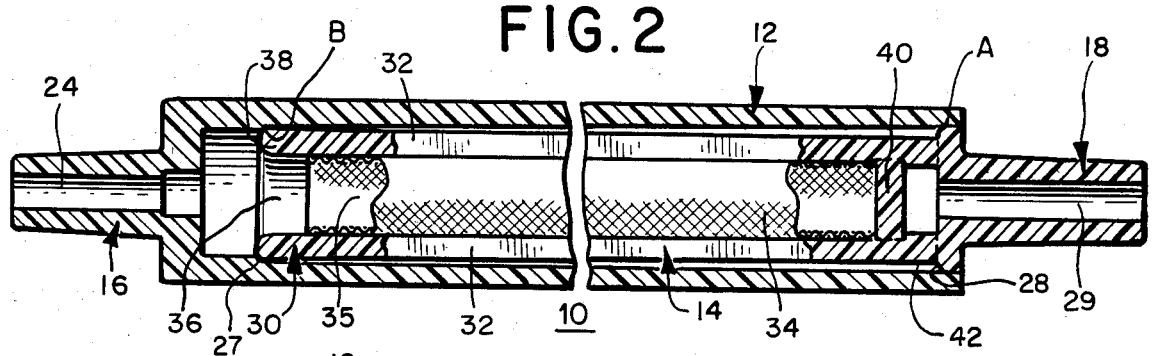
FIG. 2 illustrates a cross-sectional view of the low-profile inline filter of FIG. 1.

Referring now to the drawings, FIGS. 1 and 2 illustrates a preferred embodiment of the low-profile inline filter 10 of the present invention. The filter unit 10 includes a housing unit 12 and a filter frame 14. The housing 12 includes an inlet member 16 which allows fluid to enter the filter unit 10 so that it may be filtered. Correspondingly, the filter frame 14 includes an outlet member 18 which allows fluid to exit the filter unit 10 after it has been filtered. In use, an IV tubing (not shown) is connected to the inlet 16 so that fluid may flow through the filter unit 10, where it is filtered, and then exit through the outlet 18 into a second IV tubing (not shown).

Figure 3:
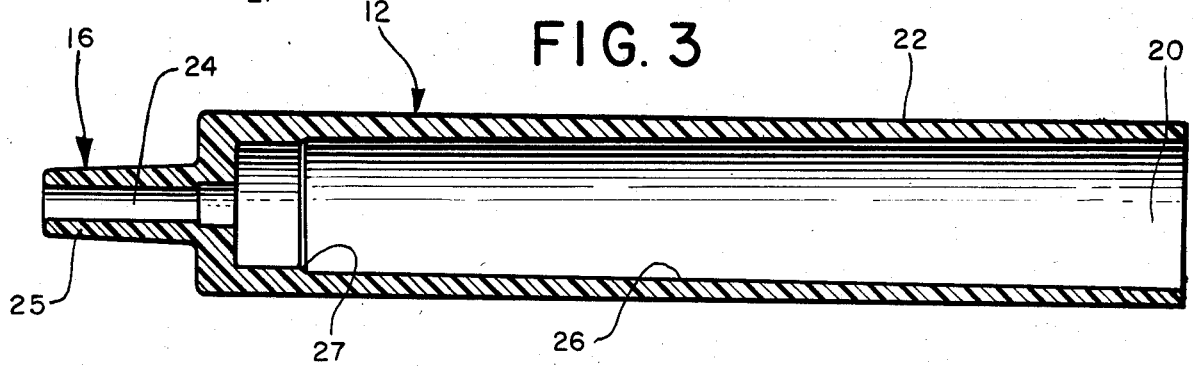
FIG. 3 illustrates a cross-sectional view of the housing unit of the low-profile inline filter.

Referring now to FIG. 3, the housing 12 is illustrated. The housing 12 is a substantially tubular shell unit which includes an opening 20 at one end, walls 22, and the inlet 16 at the other end. The inlet 16 includes an aperture 24, which is in fluid communication with the interior of the housing 12, and a tapered end 25. As previously stated, the inlet 16 is constructed so that it may be sealed to a tubing (not shown) of an IV set allowing fluid to be filtered in the filter unit 10. To this end, the tubing is connected or sealed to the tapered end 25.

The walls 22 of the housing 12 include an interior stepped portion 27 located nearer the end of the housing unit 12 containing the inlet member 16. The stepped portion 27 of the walls 22 has a circumference which is less than the circumference of the remaining interior portion 26 of the walls 22. As will be discussed hereinafter, the stepped portion 27 provides a seat for the filter frame 14.

Figure 4:
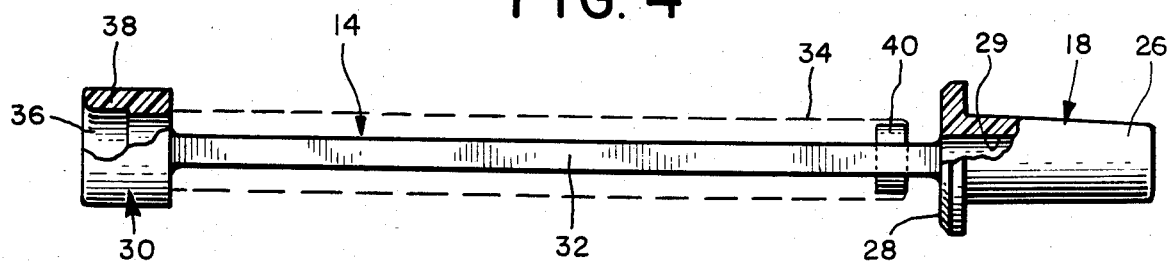
FIG. 4 illustrates a prespective view with parts broken away of the filter housing of the low-profile inline filter housing.

Referring now to FIG. 4, the filter frame 14 of the filter unit 10 is illustrated. The filter frame 14 includes an outlet member 18, which includes an aperture 29, a tapered end portion 26, which is sealed to an IV tubing allowing fluid to exit the filter unit 10, and a cap portion 28. Located at an opposite end of the filter frame 14 is a ring member 30. Disposed between the ring member 30 and the outlet member 18 are ribs 32 which support a filter membrane 34. The ring member 30 includes walls 38 which define an aperture 36. The filter membrane 34 is secured within the aperture 36 of the ring member 30. Thus, a fluid passageway is created through the aperture 36 in the ring member 30 into the filter membrane 34.

The filter membrane 34 defines a tubular, substantially cylindrical, passageway 35 which extends longitudinally between the ribs 32. The filter membrane 34 is made of a thin sheet of screen material, which is permeable to fluids but not to particulate matter over a certain size. The filter membrane 34 is preferably made of reinforced cellulose acetate. Alternatively, it may be made of teflon, cellulose nitrate, woven monofilament polyester or nylon, or other suitable material. The minimum size of the particulate material to which the filter membrane 34 is impermeable is determined by the mesh size of the screen from which the filter membrane 34 is made. The mounting of the filter membrane 34 is preferably accomplished by insert-molding the filter frame 14 onto the filter membrane 34.

Located at an opposite end of the ring member 30 between the ribs 32 is a plug member 40. The plug member 40 is positioned between the ribs 32 to close up one end of the tubular passageway 35 of the filter membrane 34. The plug member 40 is positioned longitudinally from the cap portion 28 of the outlet 18 so as not to close off the fluid passageway from the inlet 16 to the outlet 18. Instead, as illustrated in FIGS. 1 and 2, the plug member 40 allows fluid to pass between the filter frame 14 and the walls 22 of the housing 12 through the fluid passageway 42. Thus, fluid which has been filtered by the filter membrane 34, is allowed to pass through the filter passageway 42 to the outlet 18 and through the outlet aperture 29 into an IV tubing.

The filter frame 14 is designed to be received within the housing unit 12. To this end, the filter frame 14 is inserted through the opening 20 into the housing unit 12 so that the ring member 30 seats against the step portion 27 of the interior walls 22 of the housing 12. When the filter frame 14 is so received, the cap portion 28 will be securely received within the aperture 20. Once the filter frame 14 is so received within the housing 12, the filter frame is sonically welded to the housing at points A and B. As illustrated in FIGS. 1 and 2, point A is where the cap portion 28 seats on the opening 20, and point B is where the ring member 30 seats on the step portion 27. As previously stated, because the filter unit 10 is to be utilized to filter fluids before they are passed into a blood stream, it is critical that points A and B provide hermetic seals so that fluid does not bypass the filter membrane 34 and/or so that contaminants do not enter the filter unit 10 contaminating the fluid contained therein.

Figure 5:
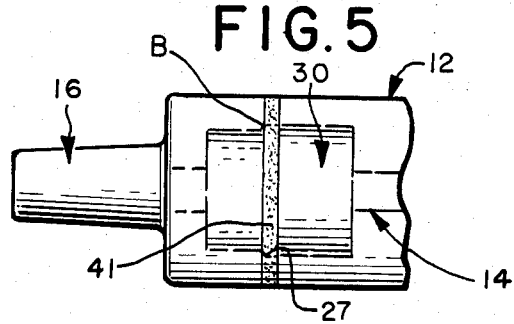
FIG. 5 illustrates a portion of the low-profile inline filter including a visible line.
Figure 6:
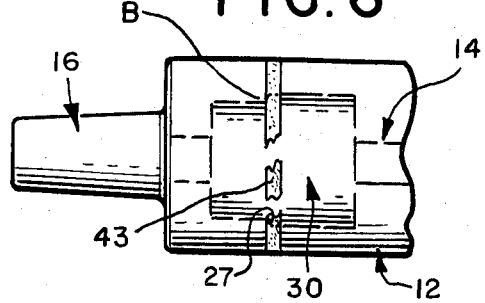
FIG. 6 illustrates a portion of the low-profile inline filter including a disjointed visible line.

As illustrated in FIG. 5, when a hermetic seal is present between the ring member 30 and the step portion of the housing 27, at point B, a visible line 41 circumscribes the interior wall of the housing 12. Because at least a portion of the housing wall 12 is translucent this line 41 is easily visible to an inspector of the filter unit 10. As illustrated in FIG. 6, if an internal hermetic seal is not present between the ring member 30 and the step interior wall 27 of the housing unit 12, a disjointed visible line 43 is present at point B. This line 43 is also easily visible to the inspector of the filter unit 10.

Although the inventor does not understand completely why a line 41 circumscribing the interior wall of the filter housing 12 is present when an internal hermetic seal is established between the ring member 30 and the step portion 27 of the housing unit 12, it is believed that this phenomenon is due to the melting of the ring member 30 and stepped portion 27 during the welding of these units to each other. Because the ring member 30 is opaque and the housing member 12, at least the portion of the housing defining the stepped portion 27, is translucent, a visible line 41 is produced after the parts have been sonically welded together. This visible line 41 or 43 is due to the refraction of light off the weld.

The visible line 41 or 43 allows an inspector to easily check whether a filter unit 10 includes an internal hermetic seal at point B between the ring member 30 and interior housing 22. This is a critical seal due to the fact that if a hermetic seal is not present the fluid may bypass the filter member 34 and thereby not be filtered before it enters the blood stream of a patient. Heretofore, as previously stated, it was extremely difficult to check this seal due to the fact that it is an interior seal and is located at the inlet portion of the filter unit 10 and the filter membrane 34.

It has been found that a translucent, i.e. clear or transparent, housing unit 12 and a white ring member 30 produce a visible white ring 41 which circumscribes the interior wall of the housing 12 at point B when an internal hermetic seal is present. This white line 41 is easily visible to an inspector of the filter 10. Other colors may be utilized for the ring member 30 to produce a colored line circumscribing the interior wall of the housing 12 at point B which is visible to an inspector. Moreover, as long as the housing unit 12 is translucent and the ring member 30 is opaque, both the ring unit 30 and the housing unit 12 may be colored and a visible line still will be produced.

With the exception of the filter membrane 34, the filter unit 10 is preferably made of a thermoplastic. Preferably, the filter unit 10 is made of acrylic, styrene, or cryolite.

It should be understood that various changes and modifications to the preferred embodiments described herein will be apparent to those skilled in the art. Such changes and modifications can be made without departing from the spirit and scope of the present invention and without diminishing its attendant advantages. It is therefore intended that such changes and modifications be covered by the following claims.

I claim:

1. A low-profile inline filter comprising:
   a housing unit including means defining an inlet at one end, for allowing fluid to enter the inline filter, a translucent stepped portion, and means defining an opening at the other end;
   a filter frame unit including means defining an outlet means at one end, for allowing fluid to exit the inline filter, opaque means at the other end for securing the filter frame unit to the stepped portion of the housing unit by sonic welding, and rib members disposed therebetween for supporting a filter membrane;
   the filter frame unit being fitted substantially within the housing unit; and
   means for visually determining when the means for securing is hermetically sealed to the housing unit.

2. The apparatus of claim 1 wherein the filter frame is white.

3. The apparatus of claim 2 wherein the means for visually determining when the means for securing is hermetically sealed to the housing unit is a visible white line circumscribing a portion of the interior of the housing unit.

4. The apparatus of claim 1 wherein the means for securing is an opaque ring member which seats on the stepped portion of the housing unit.

5. The apparatus of claim 1 wherein the means for visually determining when the means for securing is hermetically sealed to the housing unit is a visible line circumscribing a portion of the interior of the housing unit.

6. The apparatus of claim 1 wherein the housing unit and means for securing are constructed from a thermoplastic material.

7. A low-profile inline filter comprising:
   a tubular housing unit including means defining an inlet at one end, means defining an opening at the other end defining a fluid passageway therethrough, and a translucent stepped interior wall nearer the inlet end;
   a filter frame unit including means defining an outlet at one end, an opaque ring member at the other end, and means for supporting a filter membrane being located therebetween;
   the filter frame unit being fitted substantially within the housing unit so that the ring member seats on the stepped interior wall and is sonically welded thereto; and
   means for visually determining when the ring member is hermetically sealed to the stepped portion.

8. The apparatus of claim 7 wherein the entire housing unit is translucent.

9. The apparatus of claim 8 wherein the ring member is white.

10. The apparatus of claim 7 wherein the means for visually determining is a visible line circumscribing at least a portion of the interior wall of the housing member at the seat of the ring member.

11. A two piece low-profile filter comprising:
    an integral housing unit including means defining an inlet at one end and means defining an opening at the other end, defining a fluid passageway therethrough, and a translucent stepped interior wall nearer the inlet end;
    an integral filter frame unit including means defining an outlet at one end, an opaque ring member at the other end, and rib members located therebetween, the rib members supporting a filter membrane;
    the filter frame unit being fitted substantially within the housing unit so that the ring member seats on the stepped interior wall and may be sonically welded thereto; and
    the ring member and interior wall of the housing unit when sonically welded together cooperating to provide means for visually determining when the ring member is hermetically sealed to the stepped interior wall.

12. The apparatus of claim 11 wherein the ring member is white.

13. The apparatus of claim 11 wherein the ring member is colored.

14. The apparatus of claim 11 wherein the means for visually determining is a visible line at least partially circumscribing the interior wall of the housing unit near the stepped portion.

15. The apparatus of claim 14 wherein the visible line is colored.

16. The apparatus of claim 14 wherein the visible line is white.

17. The apparatus of claim 11 wherein the filter frame unit and housing unit are constructed from a thermoplastic material.

18. The apparatus of claim 17 wherein the thermoplastic material is an acrylic.

* * * * *